United States Patent
Nagano

[11] Patent Number: 5,288,278
[45] Date of Patent: Feb. 22, 1994

[54] BICYCLE CHAIN

[75] Inventor: Masashi Nagano, Osaka, Japan

[73] Assignee: Shimano Inc., Osaka, Japan

[21] Appl. No.: 814,581

[22] Filed: Dec. 30, 1991

[30] Foreign Application Priority Data

Jan. 9, 1991 [JP] Japan .................. 3-200[U]

[51] Int. Cl.⁵ .......................................... F16G 13/02
[52] U.S. Cl. ........................... 474/228; 474/233
[58] Field of Search ............... 474/212-217, 474/226, 228-231, 206, 209, 77-80, 232-235, 162, 163

[56] References Cited

U.S. PATENT DOCUMENTS

| | | | |
|---|---|---|---|
| 901,789 | 10/1908 | Dodge | 474/229 |
| 1,259,028 | 3/1918 | Layman | 474/213 X |
| 1,948,404 | 2/1934 | Tremolieres | 474/226 X |
| 1,953,388 | 4/1934 | Bettin | 474/231 |
| 3,242,752 | 3/1966 | Acri | 74/245 |
| 4,625,507 | 12/1986 | Moritz et al. | 474/206 X |
| 4,704,098 | 11/1987 | Tsubakimoto | 474/206 |
| 4,858,424 | 8/1989 | Lodgin et al. | 59/78.1 |

FOREIGN PATENT DOCUMENTS

| | | | |
|---|---|---|---|
| 171561 | 2/1986 | European Pat. Off. | |
| 326782 | 4/1914 | Fed. Rep. of Germany | 474/206 |
| 3121912 | 12/1982 | Fed. Rep. of Germany | 474/228 |
| 848483 | 1/1939 | France | 474/206 |
| 2583852 | 12/1986 | France | |
| 447234 | 4/1949 | Italy | 474/231 |
| 549961 | 10/1956 | Italy | 474/228 |
| 530979 | 10/1976 | U.S.S.R. | 474/206 |
| 701056 | 12/1953 | United Kingdom | |
| 1037489 | 7/1966 | United Kingdom | |
| 2194308 | 3/1988 | United Kingdom | |

*Primary Examiner*—Ramon S. Britts
*Assistant Examiner*—Roger J. Schoeppel
*Attorney, Agent, or Firm*—Dickstein, Shapiro & Morin

[57] ABSTRACT

A bicycle chain having link plates connected to be oscillatable relative to one another within a predetermined range of flexion. To determine the range of flexion, outer link plates include engaged members, and inner link plates include engageing members for engageing the engaged members. A maximum range of flexion of the chain is determined by contact between the engaged members and engageing members. This maximum range of flexion is determined to enable the chain to be wound around the smallest pulley of a speed changer or derailleur.

11 Claims, 5 Drawing Sheets

F I G. 4
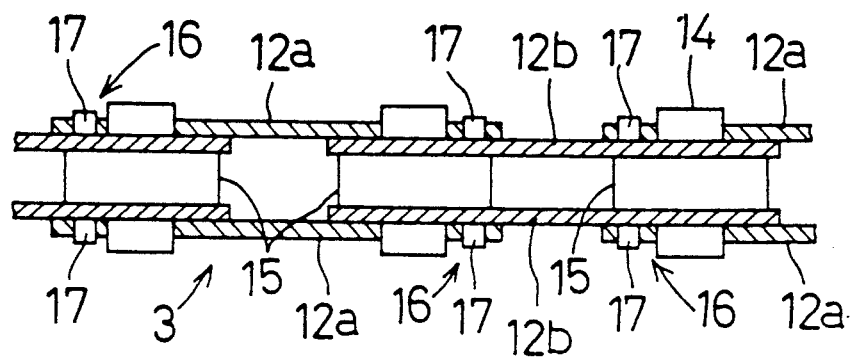
F I G. 5
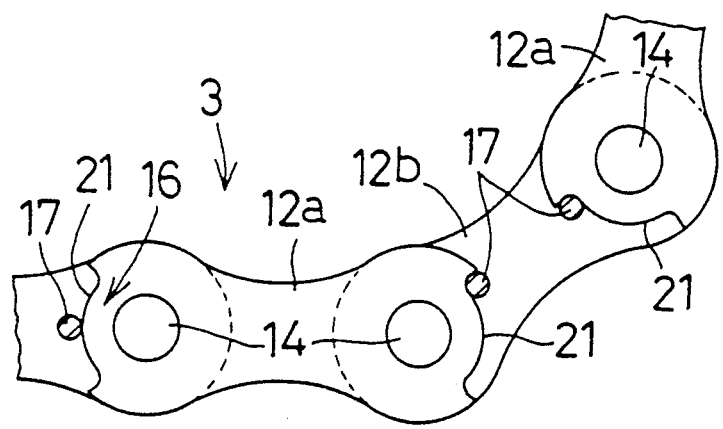

BICYCLE CHAIN

BACKGROUND OF THE INVENTION

1. Field of the Invention

The present invention relates to a bicycle chain.

2. Description of the Related Art

In a conventional bicycle chain, link plates interconnected through chain pins are oscillatable or flexible about the chain pins until the link plates contact one another. This freedom of flexion allowing the link plates to oscillate to a great extent until one link plate contacts an adjacent link plate, may cause a trouble of part of the chain becoming flexed and tangled in a complicated way when the bicycle bumps along an undulating ground, imparting forces to oscillate the link plates about the chain pins. In the worst case, such a trouble could result in damage to a speed changer, abnormal meshing between the chain and chainwheel, or abnormal running due to an interference between the chain and speed changer.

SUMMARY OF THE INVENTION

The object of the present invention is to eliminate the disadvantage of the prior art noted above, and provide a chain, particularly a bicycle chain, which is operable smoothly without flexing to an unnecessary extent even when the bicycle makes a bumping run.

The above object is fulfilled, according to the present invention, by a flexion limiting device for limiting relative oscillatory flexion of adjacent link plates to a predetermined range. This flexion limiting device prevents the chain from flexing in excess of a necessary extent. A maximum range of flexion of the chain is determined such that a minimum radius of curvature normally formed by the chain when meshed with pulleys substantially corresponds to a radius of the smallest pulley used in a speed changer of the bicycle. This construction effectively avoids the inconveniences caused by flexion of the chain in excess of the above-mentioned necessary extent, without affecting meshing of the chain with the pulleys and multistage sprockets.

This chain is particularly advantageous when used on a mountain bike or the like which often runs across undulating grounds and makes other off-road runs. The invention protects the speed changer from damage due to abnormal flexion of the chain, and avoids faulty meshing of the chain.

In a preferred embodiment of the invention, the flexion limiting device includes engaged members formed in outer link plates, and engageing members formed on inner link plates for engageing the engaged members. In this case, the maximum range of flexion of the chain is determined by contact between the engaged members and engageing members.

Other preferred forms of the flexion limiting device will be apparent from the appended dependent claims and the following description of embodiments.

BRIEF DESCRIPTION OF THE DRAWINGS

FIG. 4 is a plan view partly in section of the chain shown in FIG. 3.

FIG. 5 is a side view showing a chain in another embodiment of the invention.

DETAILED DESCRIPTION OF THE PREFERRED EMBODIMENTS

Figure 1:
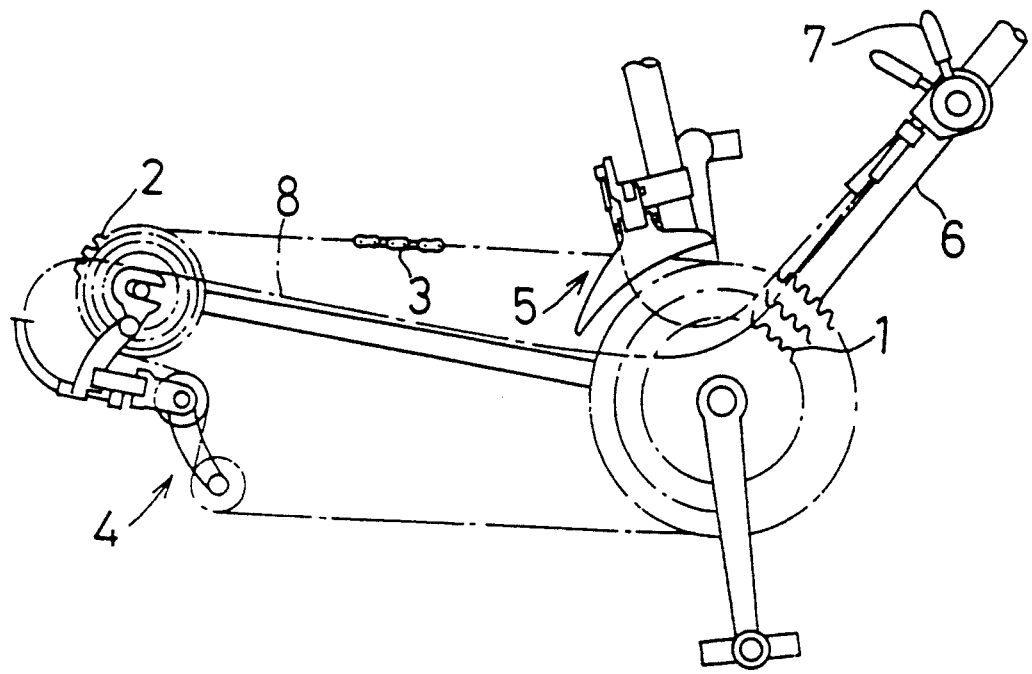
FIG. 1 is a side view showing a chain according to the present invention as used on a bicycle having speed changers.

FIG. 1 shows a chain transmission mechanism of a bicycle having speed changers. Propelling drive is transmitted from a multistage sprocket assembly 1 adjacent pedals to a rear multistage sprocket assembly 2 through a bicycle chain 3. Speed in changeable by means of a rear derailleur 4 and a front derailleur 5. A bicycle frame 6 carries a shift lever 7 connected to the rear derailleur 4 through a derailleur cable 8.

A change speed operation is carried out by shifting the chain 3 which is moved sideways on at least one of the front derailleur 5 and rear derailleur 4. This results in shifting of the chain 3 to one sprocket in each of the multistage sprocket assembly 1 adjacent the pedals and the rear multistage sprocket assembly 2.

Figure 2:
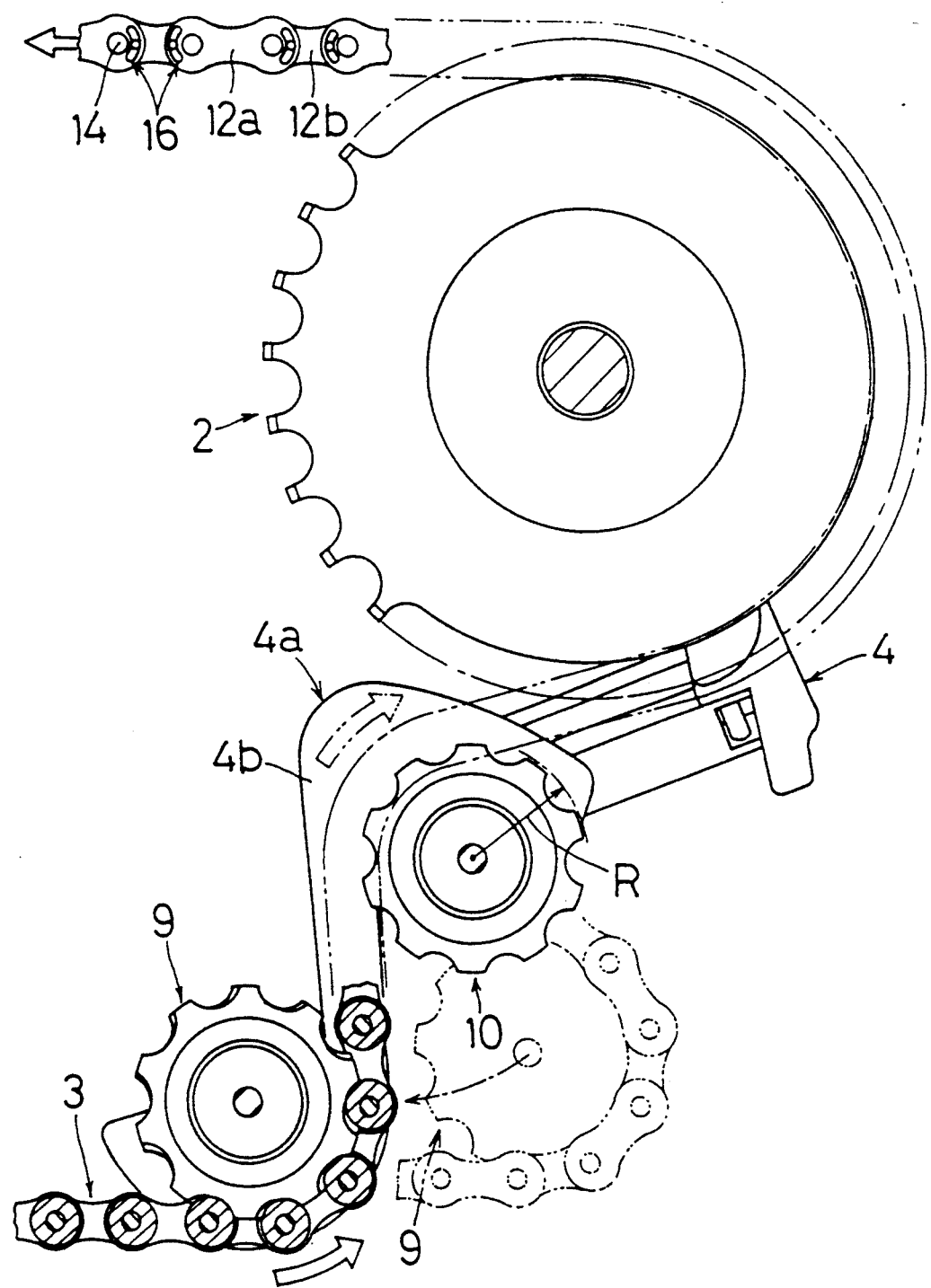
FIG. 2 is a side view of the chain engaged with a rear derailleur.

As shown in FIG. 2, the rear derailleur 4 has a chain guide 5 including a tension pulley 9 and a guide pulley 10 on which the chain 3 is wound. The tension pulley 9 is for applying tension to the chain 3, and the guide pulley 10 for changing the chain 3 on the rear multistage sprocket assembly 2. The tension pulley 9 and guide pulley 10 have the same diameter, and the chain 3 is wound around the two pulleys 9 and 10 with a radius of curvature R as shown in FIG. 2. Where the two pulleys have different diameters, the radius of curvature of the chain 3 wound is determined with reference to the smaller pulley. That is, where the guide pulley 10 is smaller than the tension pulley 9, the radius of curvature R of the chain 3 is determined by the guide pulley 10.

Figure 3:
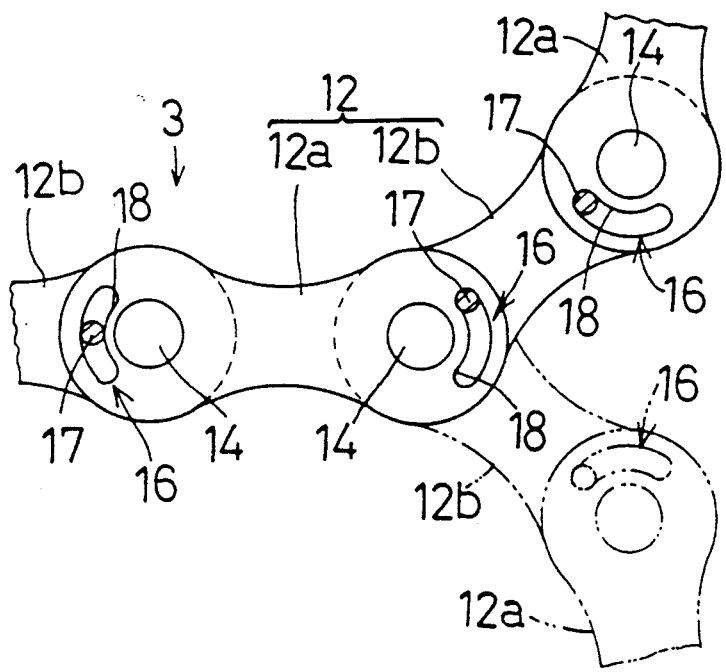
FIG. 3 is a side view showing part of the chain according to the present invention.

As shown in FIGS. 3 through 5, the chain 3 includes pairs of link plates 12 arranged in series, chain pins 14 each pivotally interconnecting adjacent link plates 12, and rollers 15 loosely mounted on the chain pins 14 for smoothing entry of teeth of the sprocket assemblies 1 and 2 and the like. A pair of link plates 12a is connected to opposite adjacent pairs of link plates 12b lying inwardly thereof. Thus, the link plates 12a are called herein outer link plates, and the link plates 12b inner link plates.

Flexion limiting devices 16 are provided at connections between adjacent link plates 12a and 12b for limiting flexion of the chain 3 so that the chain 3 has a minimum radius of curvature corresponding to the radius of curvature R with which the chain is wound around the tension pulley 9 and guide pulley 10. As shown in FIGS. 3 and 4, each flexion limiting device 16 includes pins 17 projecting laterally outwardly from the inner link plates 12b, and slots 18 defined in the outer link plates 12a to extend about the chain pin 14 for receiving the pins 17, respectively. Specifically, the pins 17 oscillatable with the inner link plates 12b are engaged in the slots 18 having a fixed length along oscillating tracks of the pins 17. As a result, the inner link plates 12b are oscillatable within a fixed angle relative to the outer link plates 12a, thereby limiting flexion of the chain 3. In this invention, the slots 18 have such a length that the minimum radius of curvature of the chain 3 corresponds to the radius of curvature R with which the chain is wound around the tension pulley 9 and guide pulley 10.

FIG. 5 shows a second embodiment in which the outer link plates 12a define cutouts 21 instead of the slots 18 for limiting oscillations of the pins 17 formed on the inner link plates 12b.

Figure 6:
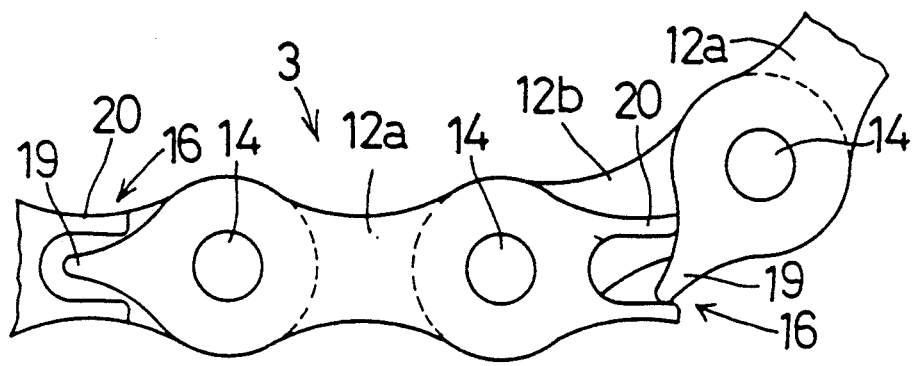
FIG. 6 is a side view of a chain in a further embodiment of the invention.

In a third embodiment shown in FIG. 6, each pair of outer link plates 12a has projections 19 continuous with a longitudinal ends thereof, while engageing portions 20 extend from opposite longitudinal ends of an adjacent pair of outer link plates 12a for engageing the projections 19. These projections 19 and engageing portions 20 constitute a flexion limiting device 16 for limiting flexibility of the chain 3.

Figure 7:
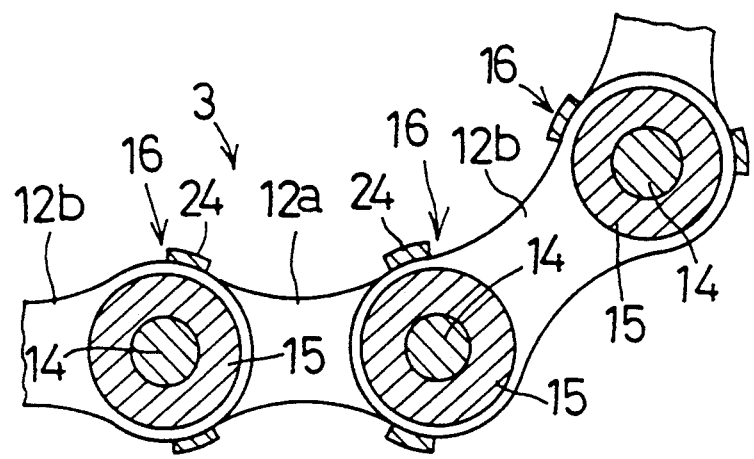
FIG. 7 is a side view partly in section of a chain in a still further embodiment of the invention.
Figure 8:
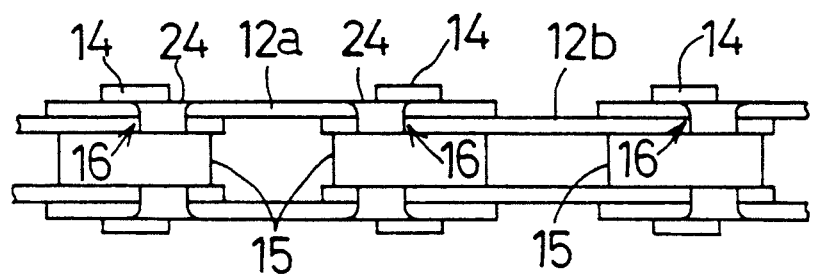
FIG. 8 is a plan view of the chain shown in FIG. 7.
Figure 9:
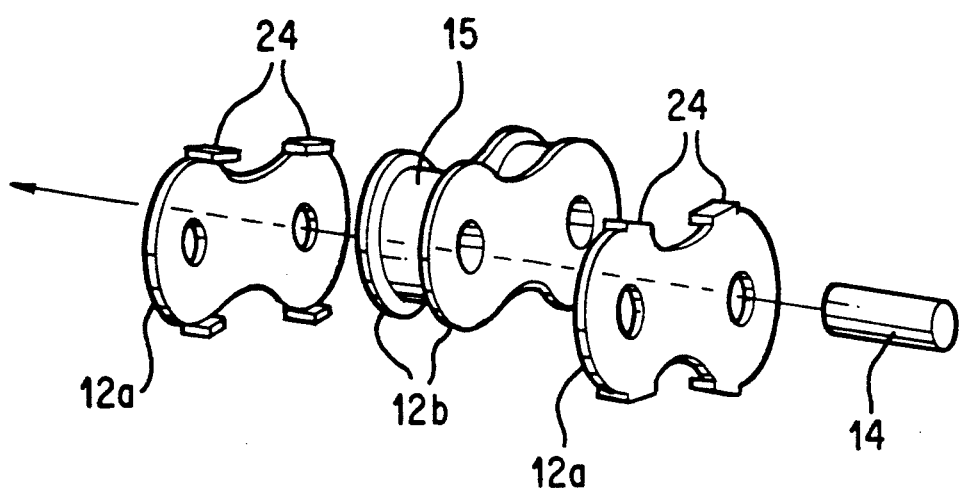
FIG. 9 is an expanded three-dimensional view of the chain shown in FIGS. 7 and 8.

In a fourth embodiment shown in FIGS. 7, 8 and 9, each pair of outer link plates 12a includes bent portions 24 formed at opposite connections thereof with adjacent inner link plates 12b, which are bent at right angles to a flexing direction of the chain 3. These bent portions 24 constitute a flexion limiting device 16 for limiting flexibility of the chain 3.

In the described embodiments, the flexion limiting devices 16 are provided at all of the connections between the link plates 12a and 12b. These limiting devices 16 may be provided at every other connections as long as the minimum radius of curvature of the chain 3 corresponds to the radius of curvature R with which the chain is wound around the tension pulley 9 and guide pulley 10.

What is claimed is:

1. A bicycle chain, comprising:
   a plurality of outer link plates (12a) and a plurality of inner link plates (12b), said inner link plates being adjacent to said outer link plates;
   chain pins (14) for rotatably interconnecting pairs of said outer link plates to pairs of said inner link plates; and
   rollers (15) located on said chain pins, said rollers being rotatable with respect to said inner and outer link plates; and
   wherein each of said outer link plates include limiting means for limiting the flexibility of said chain to a predetermined range, and wherein said inner link plates include no means for limiting the flexibility of said chain.

2. A bicycle chain as claimed in claim 1, wherein said limiting means limits the flexibility of said chain by abutment of a portion of one of said outer link plates with a portion of an adjacent one of said outer link plates.

3. A bicycle chain as claimed in claim 2, wherein each of said outer link plates has first and second longitudinal ends, with each of said first longitudinal ends having a projection (19), and with each of said second longitudinal ends having a tine (20), and wherein said limiting means limits the flexibility of said chain by abutment of at least one of said projections with an adjacent one of said tines.

4. A bicycle chain as claimed in claim 1, wherein said limiting means includes abutments.

5. A bicycle chain as claimed in claim 4, wherein said abutments (24) are bent inwardly.

6. A bicycle chain as claimed in claim 1, wherein each one of said outer link plates is in the form of a single plate, with said limiting means forming an integral part of each one of said single plates.

7. A bicycle chain, comprising:
   a plurality of outer link plates and a plurality of inner link plates, said inner link plates being adjacent to said outer link plates;
   chain pins for rotatably interconnecting pairs of said outer link plates to pairs of said inner link plates; and
   rollers located on said chain pins, said rollers being rotatable with respect to said inner and outer link plates; and
   wherein each of said inner link plates has first and second longitudinal ends, with each of said first longitudinal ends having a projection, and with each of said second longitudinal ends having a pair of tines, and wherein the flexibility of said chain is limited by abutment of at least one of said projections with an adjacent one of said tines; and
   wherein said outer link plates include no means for limiting the flexibility of said chain.

8. A bicycle transmission system, said system comprising:
   (A) a plurality of rear sprockets;
   (B) a rear derailleur having a first guide pulley, said guide pulley having a smaller diameter than that of said rear sprockets; and
   (C) a chain wound around said guide pulley and one of said rear sprockets, said chain including:
      (a) a plurality of outer link plates (12a) and a plurality of inner link plates (12b), said inner link plates being adjacent to said outer link plates;
      (b) chain pins (14) for rotatably interconnecting pairs of said outer link plates to pairs of said inner link plates;
      (c) rollers (15) located on said chain pins, said rollers being rotatable with respect to said inner and outer link plates; and
      (d) limiting means for limiting the flexibility of said chain to a predetermined range, wherein said predetermined range allows said chain to be wound around said guide pulley.

9. A bicycle transmission system as claimed in claim 8, wherein said first guide pulley is located on the inside of said chain, and wherein said transmission system further comprises a second guide pulley, said second guide pulley being located on the outside of said chain, and wherein said limiting means allows said chain to be wound around said second guide pulley, and wherein each one said inner and outer link plates has a longitudinal axis, and wherein said predetermined range is substantially symmetrical with respect to said longitudinal axes of said inner and outer link plates.

10. A bicycle transmission system as claimed in claim 8, wherein said limiting means is an element only of said outer link plates.

11. A bicycle transmission system as claimed in claim 8, wherein said limiting means is an element only of said inner link plates.

* * * * *